United States Patent
Hanada et al.

(10) Patent No.: US 8,225,117 B2
(45) Date of Patent: Jul. 17, 2012

(54) ELECTRONIC DEVICE AND IMAGE PROCESSING APPARATUS

(75) Inventors: Tsunehiro Hanada, Fukuoka (JP); Masaharu Uchiyama, Fukuoka (JP)

(73) Assignee: Panasonic Corporation, Osaka (JP)

( * ) Notice: Subject to any disclaimer, the term of this patent is extended or adjusted under 35 U.S.C. 154(b) by 221 days.

(21) Appl. No.: 12/753,410

(22) Filed: Apr. 2, 2010

(65) Prior Publication Data
US 2010/0257386 A1 Oct. 7, 2010

Related U.S. Application Data

(63) Continuation of application No. PCT/JP2008/002762, filed on Oct. 1, 2008.

(30) Foreign Application Priority Data

Oct. 2, 2007 (JP) ................ P2007-258685

(51) Int. Cl.
*G06F 1/32* (2006.01)
(52) U.S. Cl. ............. 713/310; 713/320; 713/324
(58) Field of Classification Search .......... 710/300, 710/310, 320, 323, 324
See application file for complete search history.

(56) References Cited

U.S. PATENT DOCUMENTS

| 6,668,328 | B1 * | 12/2003 | Bell | 713/300 |
| 2007/0086514 | A1 * | 4/2007 | Lawrence | 375/219 |
| 2008/0012724 | A1 * | 1/2008 | Corcoran et al. | 340/870.02 |
| 2008/0080625 | A1 * | 4/2008 | Miyata | 375/257 |

FOREIGN PATENT DOCUMENTS

| JP | 9-294175 | 11/1997 |
| JP | 2002-79722 | 3/2002 |
| JP | 2005-33829 | 2/2005 |
| JP | 2005-143026 | 6/2005 |
| JP | 2006-234970 | 9/2006 |

* cited by examiner

*Primary Examiner* — Glenn A Auve
(74) *Attorney, Agent, or Firm* — Dickinson Wright PLLC

(57) ABSTRACT

An electronic device capable of decreasing power consumption is provided. A multiple function apparatus including a power line communication function has a plurality of units such as a PLC board, a main control board, a printer control board, a printer, and a FAX control board. The multiple function apparatus also includes a device power supply unit for supplying power to the units independently. A power supply control unit of the PLC board outputs a power supply control signal in response to a state change of the multiple function apparatus and controls power supply to each unit.

15 Claims, 5 Drawing Sheets

ELECTRONIC DEVICE AND IMAGE PROCESSING APPARATUS

CROSS REFERENCE TO RELATED APPLICATION

This application is a continuation of PCT application No. PCT/JP2008/2762, which was filed on Oct. 1, 2008 based on Japanese Patent Application (No. 2007-258685) filed on Oct. 2, 2007, the contents of which are incorporated herein by reference.

BACKGROUND

1. Technical Field

The present invention relates to an electronic device and an image processing apparatus including a power line communication function.

2. Background Art

A multiple function image forming apparatus (which may be simply called multiple function apparatus or MFP (Multi Function Peripheral)) including various image processing functions containing a facsimile function, a printer function, a copy function, and a scanner function can be used as a communication apparatus, an image processing apparatus, an image output unit, or the like. Since consecutive use of the functions is a rare case, a multiple function apparatus become widespread (for example, refer to JP-A-2005-33829).

The multiple function apparatus generally has a standby state in which the corresponding function can operate immediately when an external signal or operation from an operation unit is input, and a sleep state in which although immediate operation is impossible, when an external signal or operation from an operation unit is input, a transition is made to an operable state and then the operation corresponding to the external signal input or operation input from the operation unit is performed.

In the standby state, power is supplied to all units of the multiple function apparatus and when the external signal or operation from the operation unit is input, immediately the corresponding function can be executed. In the sleep state, power is supplied to a unit for detecting external signal input or operation input from the operation unit and for controlling to supply power to all units of the multiple function apparatus (for example, a circuit board for implementing a main control unit) and power supply to a circuit board for performing any other control, a printer unit, a scanner unit, etc., is stopped. Therefore, power consumption of the multiple function apparatus can be decreased.

However, the main control unit to which power is supplied even in the sleep mode generally has a function of controlling the whole multiple function apparatus and thus power consumption of the hardware unit (circuit board, etc.,) for implementing the main control unit is large; if power is supplied at all times, considerable power is supplied. This is not limited to the multiple function apparatus and also applies to a general electronic device wherein power supply is changed between the standby state and the sleep state.

Power line communications are communications using a power line for supply commercial power as a transmission path and when power line communications are conducted, communications are conducted among various electronic devices through a power line communication modem connected to a power supply socket. An electronic device incorporating the function of a power line communication modem is also proposed (for example, refer to JP-A-2005-143026). In such an electronic device, power supply to the electronic device and communications through a power line are made possible simply by connecting a power supply plug to a power supply socket. Also in such an electronic device having the power line communication function, if power supply is changed between the standby state and the sleep state, likewise power needs to be supplied to a main control unit at all times.

SUMMARY

It is an object of the present invention to provide an electronic device and an image processing apparatus capable of decreasing power consumption.

An electronic device according to the present invention comprises: a power line communication unit that receives a power line communication signal superposed on power transmitted through a power line; an operation unit that processes the power line communication signal and executes a predetermined operation; a first power supply unit that supplies power to the operation unit; a second power supply unit that is provided independently of the first power supply unit and supplies power to the power line communication unit; and a power supply control unit that controls power supply to the operation unit performed by the first power supply unit on the basis of the power line communication signal.

According to the invention, when the power line communication unit receives the power line communication signal and the power supply control unit causes the electronic device to make a transition from the sleep state to the standby state, if the functions of the operation unit and the first power supply unit stop, it is made possible to place the operation unit in an operable state, so that it is made possible to decrease power consumption of the electronic device.

As is obvious from the description given above, according to the present invention, an electronic device, for example, a multiple function image forming apparatus capable of decreasing power consumption can be provided.

DETAILED DESCRIPTION

Figure 1:
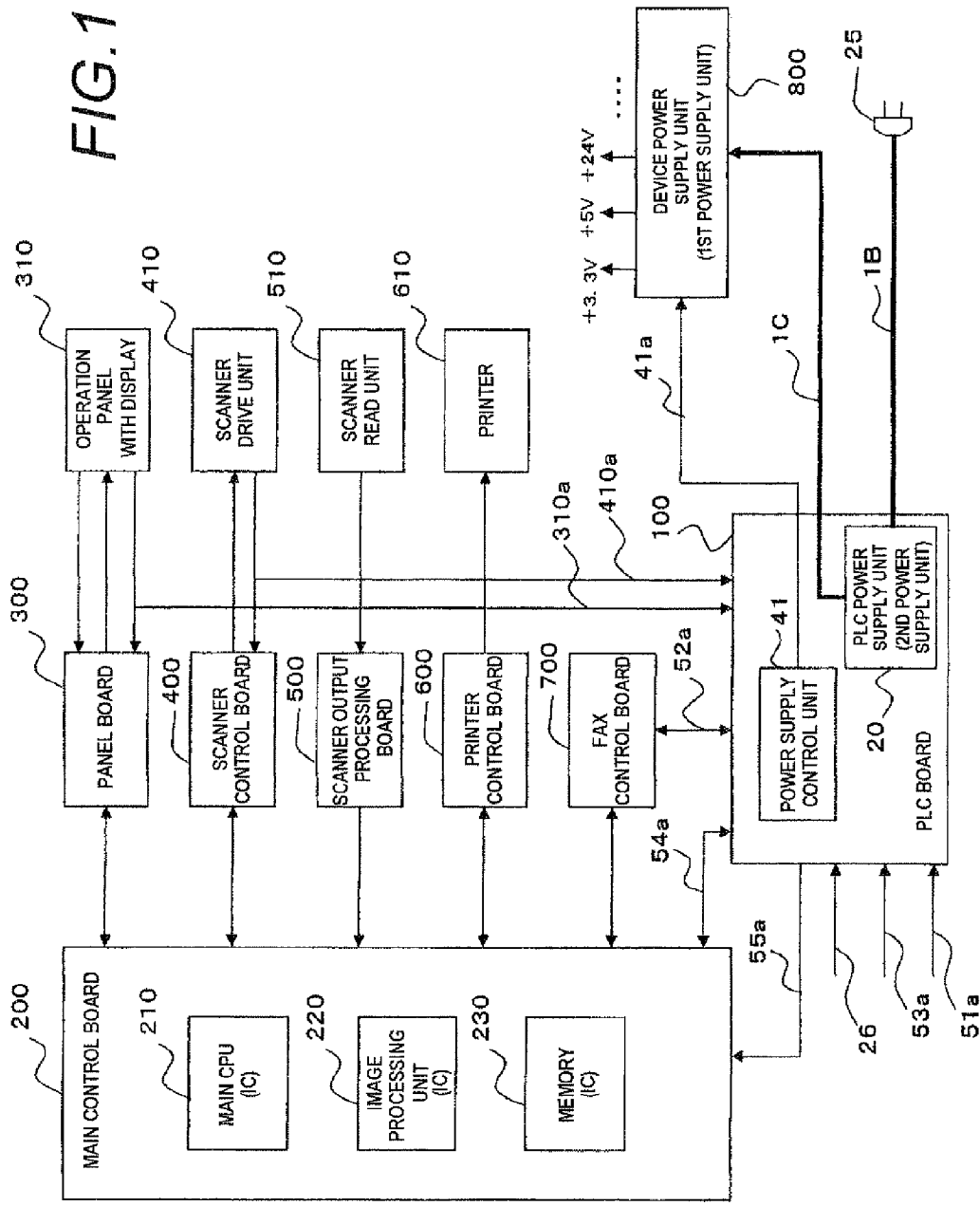
FIG. 1 shows the schematic configuration of a multiple function apparatus including a power line communication function.

An electronic device according to the present invention comprises: a power line communication unit that receives a power line communication signal superposed on power transmitted through a power line; an operation unit that processes the power line communication signal and executes a predetermined operation; a first power supply unit that supplies power to the operation unit; a second power supply unit that is provided independently of the first power supply unit and supplies power to the power line communication unit; and a power supply control unit that controls power supply to the operation unit performed by the first power supply unit on the basis of the power line communication signal.

The electronic device may further comprise a reception unit that receives a communication signal through a transmission medium different from the power line, wherein the operation unit further processes the communication signal and executes a predetermined operation, and the power supply control unit further controls power supply to the operation unit performed by the first power supply unit on the basis of the communication signal.

According to the configuration, it is made possible to perform power supply control to the operation unit on the basis of the communication signal received through any other transmission medium than the power line.

The electronic device may be configured in that the communication signal contains information concerning the operation unit, and the power supply control unit controls power supply to the operation unit performed by the first power supply unit on the basis of the information.

According to the configuration, it is made possible to determine the operation unit to which power is to be supplied by analyzing the information contained in the communication signal by the power control unit.

The electronic device may include a configuration in which the information concerning the operation unit is an IP address.

The electronic device may further comprise a relay unit that relays the communication signal to the power control unit.

According to the configuration, the communication signal received through any other transmission medium than the power line is relayed through the relay to the power control unit, so that it is made possible to perform power supply control to the operation unit on the basis of the communication signal.

The electronic device may further comprise a signal input section for inputting a control signal for controlling the operation of the operation unit, wherein the power supply control unit controls power supply to the operation unit performed by the first power supply unit on the basis of the control signal.

According to the configuration, it is made possible to perform power supply control to the operation unit on the basis of the control signal output from the signal input section.

The electronic device may include a configuration in which the signal input section is an operation panel of the electronic device.

The electronic device may include a configuration in which the signal input section is a sensor provided in the electronic device.

The electronic device may include a configuration in which the transmission medium is a public communication line.

The electronic device may include a configuration in which the transmission medium is a LAN cable.

The electronic device may include a configuration in which the transmission medium is a USB cable.

The electronic device may be configured in that the operation unit is a main control unit for controlling the whole of the electronic device.

According to the configuration, power supply to the main control unit consuming large power can be controlled, so that it is made possible to decrease power consumption of the electronic device. As the main control unit, for example, a circuit board installing a CPU for controlling the whole electronic device or the like is possible.

The electronic device may includes a configuration in which the operation unit performs image processing on the basis of data contained in at least either the power line communication signal or the communication signal.

The electronic device may include a configuration in which the operation unit has at least one of a facsimile function, a printer function, a copy function, and a scanner function.

The electronic device may be configured in that the power line communication unit and the power supply control unit are formed on the same circuit board.

According to the configuration, the power line communication unit and the power supply control unit are formed on the same circuit board, so that the power supply passage from the second power supply unit can be simplified.

(Embodiment)

An embodiment will be described below with the accompanying drawings by taking a multiple function image forming apparatus (which will be hereinafter described simply as multiple function apparatus) as an example:

A multiple function apparatus shown in FIG. 1 includes a PLC (Power Line Communication) board 100, a main control board 200, a panel board 300, an operation panel with display 310, a scanner control board 400, a scanner drive unit 410, a scanner output processing board 500, a scanner read unit 510, a printer control board 600, a printer 610, a FAX control board 700, and a device power supply unit 800.

The PLC board 100 contains a PLC circuit module for implementing a PLC modem function and a power supply control circuit module for implementing a power supply control unit for controlling power supply to each unit of the multiple function apparatus as described later in detail. Power is supplied to the PLC board 100 through a power supply cable 1B and power is further supplied to the device power supply unit 800 through an internal power supply line 1 C. The PLC board 100 is provided independently of the blocks (the main control board 200, the panel board 300, the operation panel with the display 310, the scanner control board 400, the scanner drive unit 410, the scanner output processing board 500, the scanner read unit 510, the printer control board 600, the printer 610, and the FAX control board 700) involved in the operation of the multiple function apparatus.

The main control board 200 is a board having hardware for implementing the control function of the whole multiple function apparatus; the board has at least an IC containing a main CPU 210, an IC for implementing an image processing unit 220, and an IC for implementing memory 230 for storing programs and various pieces of data of image memory, etc. The main control board 200 and the PLC board 100 are connected by a USB signal line 54a and a LAN signal line 55a. Various control signals and image data can be input and output among the panel board 300, the scanner output control board 400, the scanner processing board 500, the printer control board 600, and the FAX control board 700.

The panel board 300 is a board having hardware for controlling the operation panel with the display 310 and outputs a display control signal of the display and inputs the operation state of various switches of an operation unit under the control of the main control board 200.

The scanner control board 400 is a board having hardware for controlling the scanner drive unit 410 and controls the operation of the scanner drive unit 410 under the control of the main control board 200. The scanner control board 400 also inputs various sensor signals of a paper sensor, etc., of the scanner drive unit 410. The scanner output processing board 500 is a board having hardware for processing a read signal from the scanner read unit 510 (a signal from an image pickup device); the board performs analog processing for a read signal and then converts the signal into digital data and sends the digital data to the image processing unit 220 of the main control board 200.

The printer control board 600 is a board having hardware for controlling the printer 610 and sends necessary data to the printer 610 in accordance with a print command from the main control board 200.

The FAX control board 700 is a board having hardware for controlling transmission and reception of FAX and is connected to the PLC board 100 by a signal line 52a. A communication signal line 51a connected to a public communication line is connected to the signal line 52a for performing processing involved in transmission and reception of FAX, as described later.

The device power supply unit 800 supplies power to units of the multiple function device except the PLC board 100, and power is supplied by the internal power supply line 1C from the PLC board 100. The device power supply unit 800 converts the voltage into the voltage corresponding to each unit (board, etc.,) of the multiple function apparatus and supplies the voltage. Power supply to each unit is controlled by a power supply control signal 41a from the PLC board 100 as described later.

The functions of the multiple function apparatus except for the PLC board 100 and the hardware for implementing the functions are proposed as related arts (for example, refer to JP-A-2005-33829) and therefore will not be described again in detail.

Figure 2:
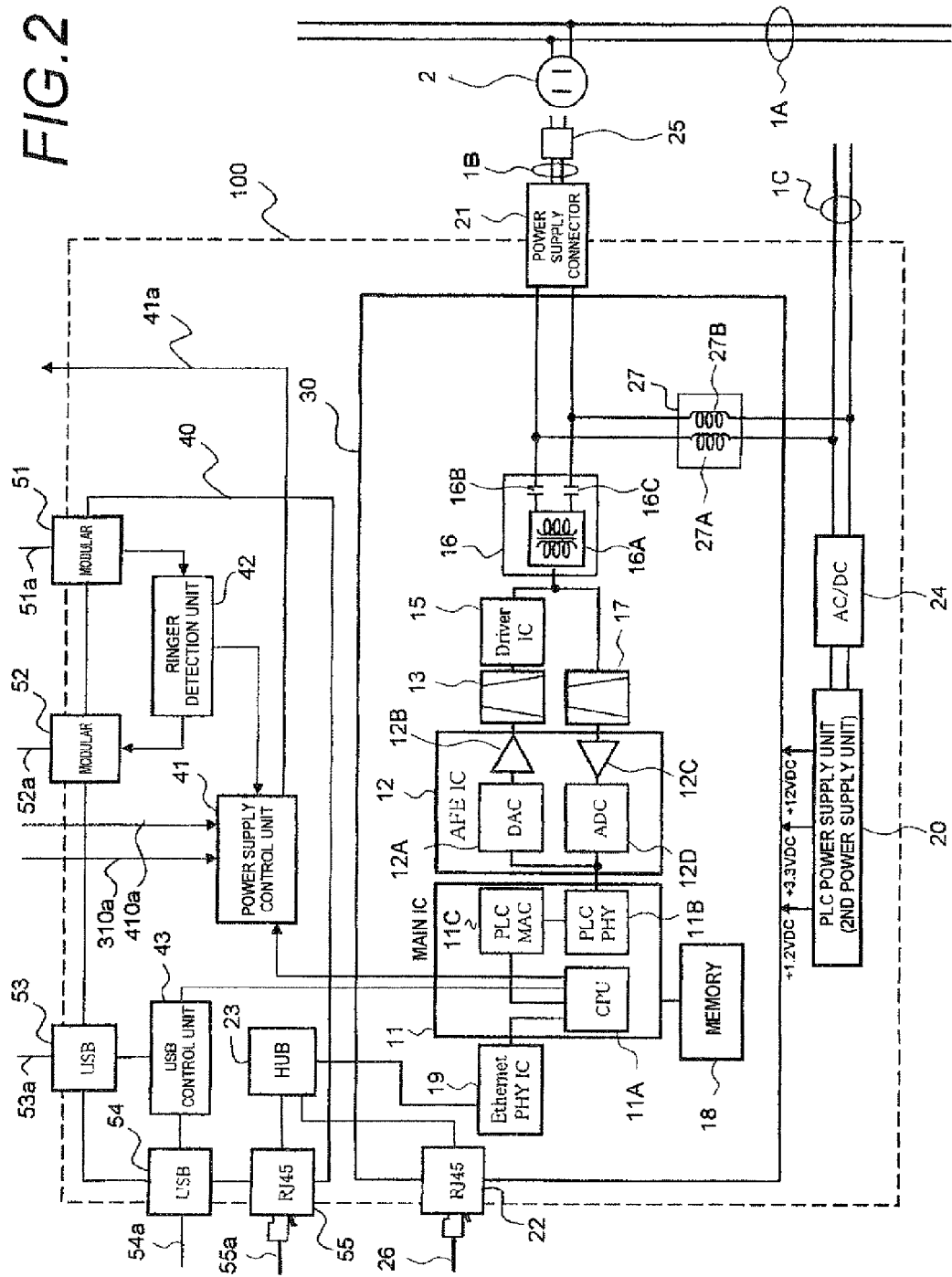
FIG. 2 is a block diagram to show an example of hardware of a PLC board in the multiple function apparatus.

The PLC board 100 has a PLC circuit module 30, a power supply control circuit module 40, and a PLC power supply unit 20 as shown in FIG. 2. The PLC power supply unit 20 supplies various (for example, +1.2 V, +3.3 V, and +12 V) voltages to the PLC circuit module 30 and the power supply control circuit module 40 and includes a switching transformer and a DC-DC converter (not shown), for example. Power is supplied to the PLC power supply unit 20 from a power supply connector 21 through an impedance upper 27 and an AC-DC converter 24. It is desirable that the PLC circuit module 30 and the power supply control circuit module 40 should be provided on the same circuit board (here, the PLC board 100) as shown in FIG. 2. If the PLC circuit module 30 and the power supply control circuit module 40 are formed as electrically independent circuits, as power supply passage from the PLC power supply unit 20, a supply passage dedicated to the PLC circuit module 30 and a supply passage dedicated to the power supply control circuit module 40 become necessary and the configuration of the power supply passage becomes complicated.

The PLC circuit module 30 functions as a PLC modem and is provided with a main IC (Integrated Circuit) 11, an AFE IC (Analog Front END Integrated Circuit) 12, a low-pass filter (LPF) 13, a driver IC 15, a coupler 16, a band-pass filter (BPF) 17, memory 18, and Ethernet (registered trademark) PHY IC (Physical layer Integrated Circuit) 19. The coupler 16 is connected to the power supply connector 21 and is further connected to a power line 1A through the power supply cable 1B, a power plug 25, and a socket 2. A LAN cable 26 for connecting to an device of a personal computer, etc., is connected to a LAN modular jack 22 and is connected to the Ethernet PHY IC 19 through a hub 23.

The main IC 11 includes a CPU (Central Processing Unit) 11A, a PLC MAC (Power Line Communication Media Access Control layer) block 11C, and a PLC PHY (Power Line Communication Physical layer) block 11B. The CPU 11A has a 32-bit RISC (Reduced Instruction Set Computer) processor. The PLC MAC block 11C manages a MAC layer (Media Access Control layer) of transmission and reception signals. The PLC PHY block 11B manages a PHY layer (Physical layer) of transmission and reception signals. The AFE IC 12 is made up of a DA converter (DAC; D/A Converter) 12A, an AD converter (ADC; ND Converter) 12D, and variable gain amplifiers (VGA; Variable Gain Amplifier) 12B and 12C. The coupler 16 includes a coil transformer 16A and coupling capacitors 16B and 16C. The CPU 11A uses data stored in the memory 18 to control the operation of PLC MAC blocks 11C1 and 11C2 and PLC PHY blocks 11B1 and 11B2 and also control the whole PLC modem.

The power supply control circuit module 40 controls power supply of the multiple function apparatus and includes a power supply control unit 41, a ringer detection unit 42, a USB control unit 43, and the hub 23. The USB control unit 43 and the hub 23 also have a function as a relay unit for relaying a signal through a USB cable and an Ethernet signal input from the LAN connection section to the PLC circuit module 30.

The power supply control unit 41 controls power supply to each unit in response to state change of the multiple function apparatus; specifically, an operation signal from the operation unit of the operation panel with the display 310, output signals of various sensors provided in the multiple function apparatus, an input signal from an external apparatus, an input signal from an external network. Input from an external apparatus may be input from the LAN connection unit or may be input through an USB interface, for example. The input signal from an external network may be a power line communication signal or may be an incoming signal (ringer signal) from a public communication line. The operation signal from the operation unit of the operation panel with the display 310 is a signal 310a of a sleep switch for releasing a sleep mode, for example, and the sensor output signal is an output signal 410a of a paper detection sensor provided in the scanner drive unit 410, for example.

The ringer detection unit 42 is connected to public line modular jacks 51 and 52 and detects an incoming call through the communication signal line 51a connected to the public communication line. The communication signal line 51a is connected to the FAX control board 700 through the public line modular jack 52 and the signal line 52a. When detecting an incoming call, the ringer detection unit 42 notifies the power supply control unit 41 of detection of an incoming call. When detecting an incoming call, the ringer detection unit 42 may notify the CPU 11A of detection of an incoming call.

The USB control unit 43 is connected to USB connectors 53 and 54 and implements USB communication control. The signal line (USB cable) 54a for conducting USB communications with the main control board 200 is connected to the USB connector 54. When a USB cable 53a is connected to the USB connector 53, the USB control unit 43 sends a signal received at the USB connector 53 to the CPU 11A of the main IC 11. When receiving the signal received at the USB connector 53, the CPU 11A transmits a signal for starting the image processing unit 220, etc., (power ON/OFF signal, etc.,) to the power supply control unit 41.

The hub 23 is connected to the LAN modular jack 22 of the PLC circuit module 30, the Ethernet PHY IC 19, and a LAN modular jack 55 of the power supply control circuit module 40. When receiving a signal from the modular jack 22 (Ethernet signal), the hub 23 relays the signal to the Ethernet PHY IC 19 and the main control board 200. The Ethernet PHY IC 19 sends the Ethernet signal received from the modular jack 22 to the CPU 11A. The CPU 11A receives the Ethernet signal from the Ethernet PHY IC 19 and if the Ethernet signal contains an IP address of the main control board, the CPU transmits a signal for starting the image processing unit 220, etc., (power ON/OFF signal, etc.,) to the power supply control unit 41. Thus, the IP address of the main control board is previously stored in the memory 18 of the PLC module 30.

When receiving the data packet, the CPU 11A refers to the memory 18 and if the IP address contained in the data packet match the IP address stored in the memory 18, the CPU 11A transmits a command signal of supplying power to the main control board 200 to the power supply control unit 41. When receiving the signal, the power supply control unit 41 starts supplying power to the main control board. If the Ethernet signal contains the IP address of the PLC, the CPU 11A processes the Ethernet signal.

As described above, since a signal indicating state change of the multiple function apparatus is input to the power supply control unit 41, power can be reliably supplied to the necessary unit according to the power supply signal. Specifically, when state change of the multiple function apparatus as mentioned above occurs in the sleep mode, a command of power supply to each unit is given and a transition is made to the standby mode. The power supply control unit 41 detects the state of the multiple function apparatus according to a signal from the ringer detection unit 42, a signal 310a of the sleep switch, an output signal 410a of a paper detection sensor, a signal from the CPU 11A based on signal reception of the USB control unit 43, and a signal from the CPU 11A based on the Ethernet signal relayed in the hub 23, but need not detect all. Further, the state of a different unit may be detected for controlling power supply in response to the type of electronic device.

In the example in FIGS. 1 and 2, the power supply control unit 41 is implemented as the hardware installed in the power supply control circuit module 40, but a part or all may be implemented as the CPU 11A of the main IC 11 installed in the PLC circuit module 30.

Next, the schematic operation of the hardware installed in the PLC circuit module shown in FIG. 2 will be described.

Power line communications of the PLC circuit module 30 are conducted schematically as follows: Data input from the LAN modular jack 22 is sent through the Ethernet PHY IC 19 to the main IC 11 and is subjected to digital signal processing to generate a digital transmission signal. The generated digital transmission signal is converted into an analog signal by the DA converter (DAC) 12A of the AFE IC 12 and the analog signal is output to the power line 1A through the low-pass filter 13, the driver IC 15, the coupler 16, the power supply connector 21, the power supply cable 1B, the power plug 25, and the socket 2.

The signal received from the power line 1A is sent to the band-pass filter 17 via the coupler 16 and is subjected to gain adjustment by the variable gain amplifier (VGA) 12 of the AFE IC 12 and then is converted into a digital signal by the AD converter (ADC) 12D. The provided digital signal is sent to the main IC 11 and is subjected to digital signal processing and is converted into digital data. The provided digital data is sent to the modular jacks 22 and 55 through the Ethernet PHY IC 19 and the hub 23. If the IP address contained in the digital data is the IP address of the main control board 200 (or the image processing apparatus, etc.,) as previously described, power supply control of the main control board 200 is performed through the CPU 11A and the power supply control unit 41 and the power of the main control board 200 is turned ON. If the received data is data to PLC itself, the CPU 11A does not send the received data to the hub 23.

When a data packet is input through the LAN modular jack 22, the data packet is transmitted through the hub 23 to a different port and the data packet is sent to the main control board 200 and the Ethernet PHY IC 19 of the PLC board 100. The data packet sent to the Ethernet PHY IC 19 is subjected to processing responsive to the IP address by the CPU 11A. That is, if the data packet sent from the LAN modular jack 22 is a data packet addressed to the own device, the CPU 11A processes the data packet. If the IP address contained in the data packet match the IP address stored in the memory 18, the CPU 11A transmits a command signal of supplying power to the main control board 200 to the power supply control unit 41 as previously described. Therefore, if the multiple function apparatus is in the sleep mode, it makes a transition to the standby mode.

When a signal is sent from the USB connector 53, the USB control unit 43 sends the signal received at the USB connector 53 to the CPU 11A of the main IC 11. When receiving the signal received at the USB connector 53, the CPU 11A transmits a signal for starting the image processing unit 220, etc., (power ON/OFF signal, etc.,) to the power supply control unit 41. In the sleep mode, data processing in the main control board 200 cannot be performed and thus a NACK (Negative Acknowledgement) signal is continuously sent through the USB connector 54. The CPU 11A transmits a signal for starting the image processing unit 220, etc., (power ON/OFF signal, etc.,) to the power supply control unit 41 and thus power is supplied to the main control board 200 by the power supply control signal 41a. When signal processing of the main control board 200 starts, the USB control unit 43 sends an ACK (Acknowledgement) signal and starts reception of data.

If a data packet from a different communication apparatus (which may be through the power line or may be through any other communication medium) contains the IP address of the main control board 200, the data packet is sent to the main CPU 210 of the main control board 200 through an Ethernet cable 55a; when power supply to the main control board 200 is stopped according to the power save mode, the main CPU 210 cannot receive a data packet from a different communication apparatus. However, the CPU 11A of the PLC module 30 can recognize the IP address of the data packet and the CPU 11A of the PLC module 30 to which power is supplied at all times outputs a signal for turning on the power to the power supply control unit 41, so that the data packet can always be received regardless of the presence or absence of power supply to the main control board. Therefore, it is made possible to supply power to the main control board 200 only while the data packet is received and is processed.

When the ringer detection unit 42 detects an incoming signal from the public line modular jack 51, the ringer detection unit 42 transmits a detection signal indicating detection of the incoming signal to the power supply control unit 41. The ringer detection unit 42 also relays a communication signal from the public line modular jack 51 with the FAX control unit 700 through the public line modular jack 52.

Figure 3:
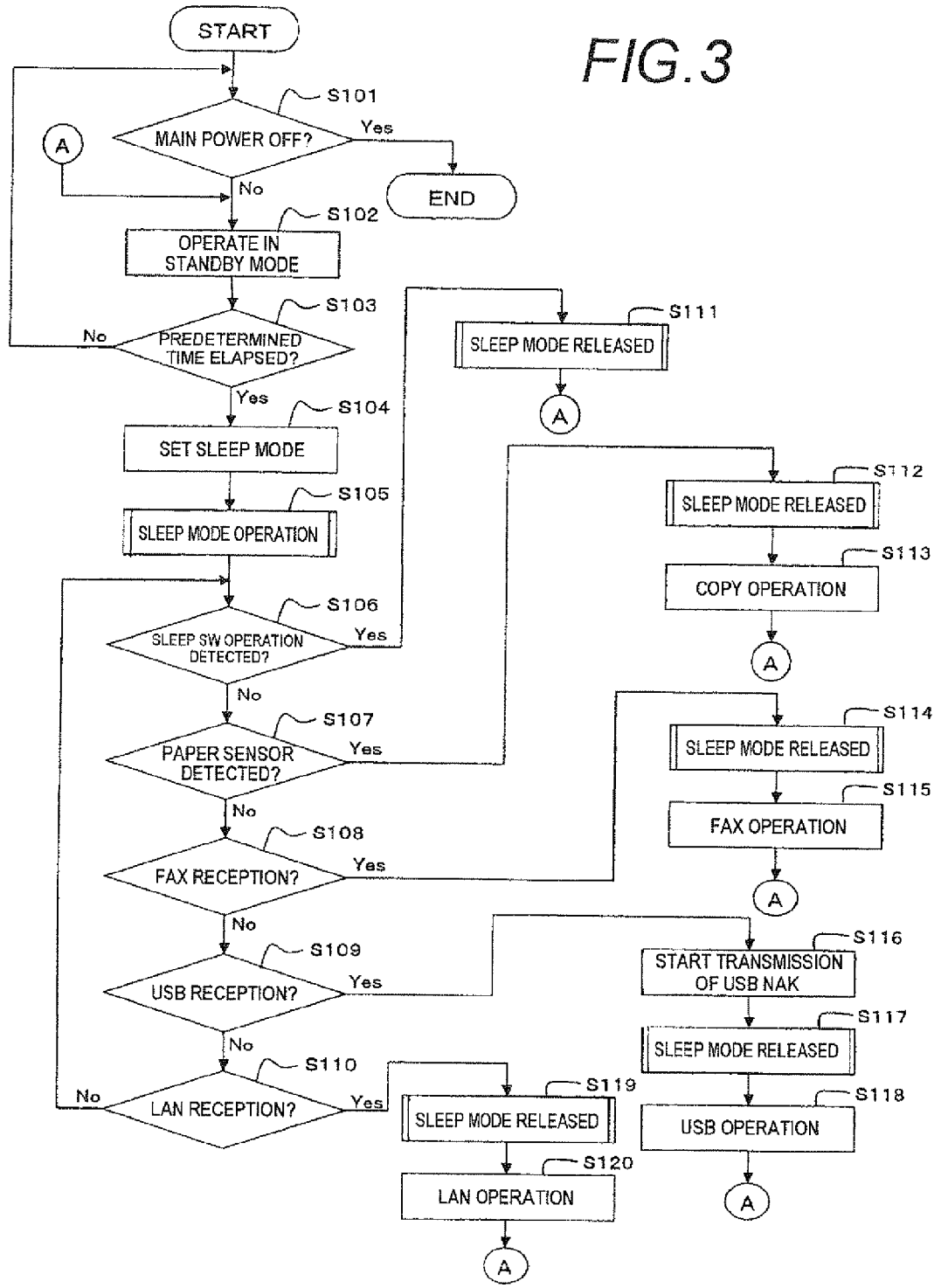
FIG. 3 shows a schematic operation flow of power supply control of the multiple function apparatus.
Figure 4:
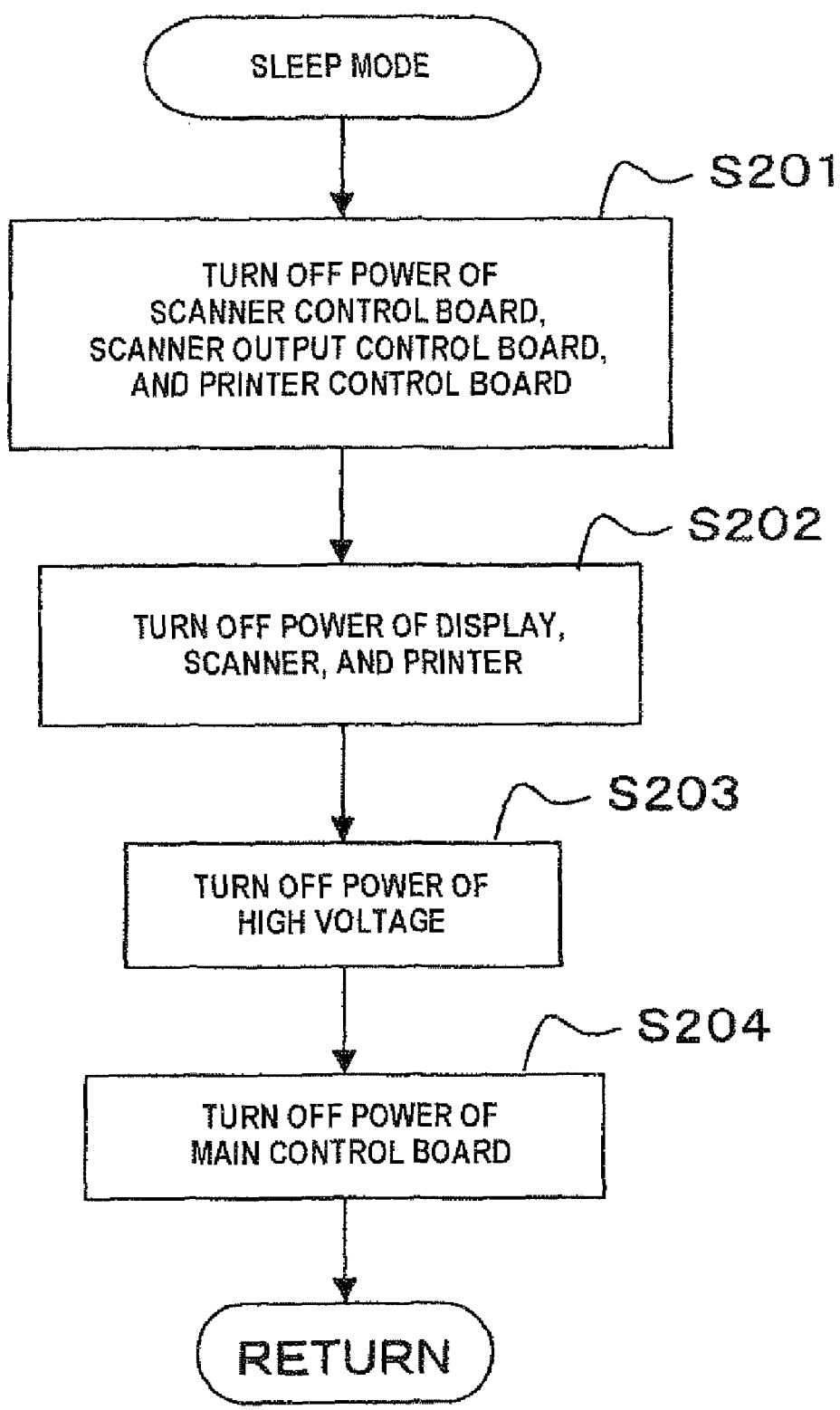
FIG. 4 shows a schematic operation flow of power supply control of the multiple function apparatus.
Figure 5:
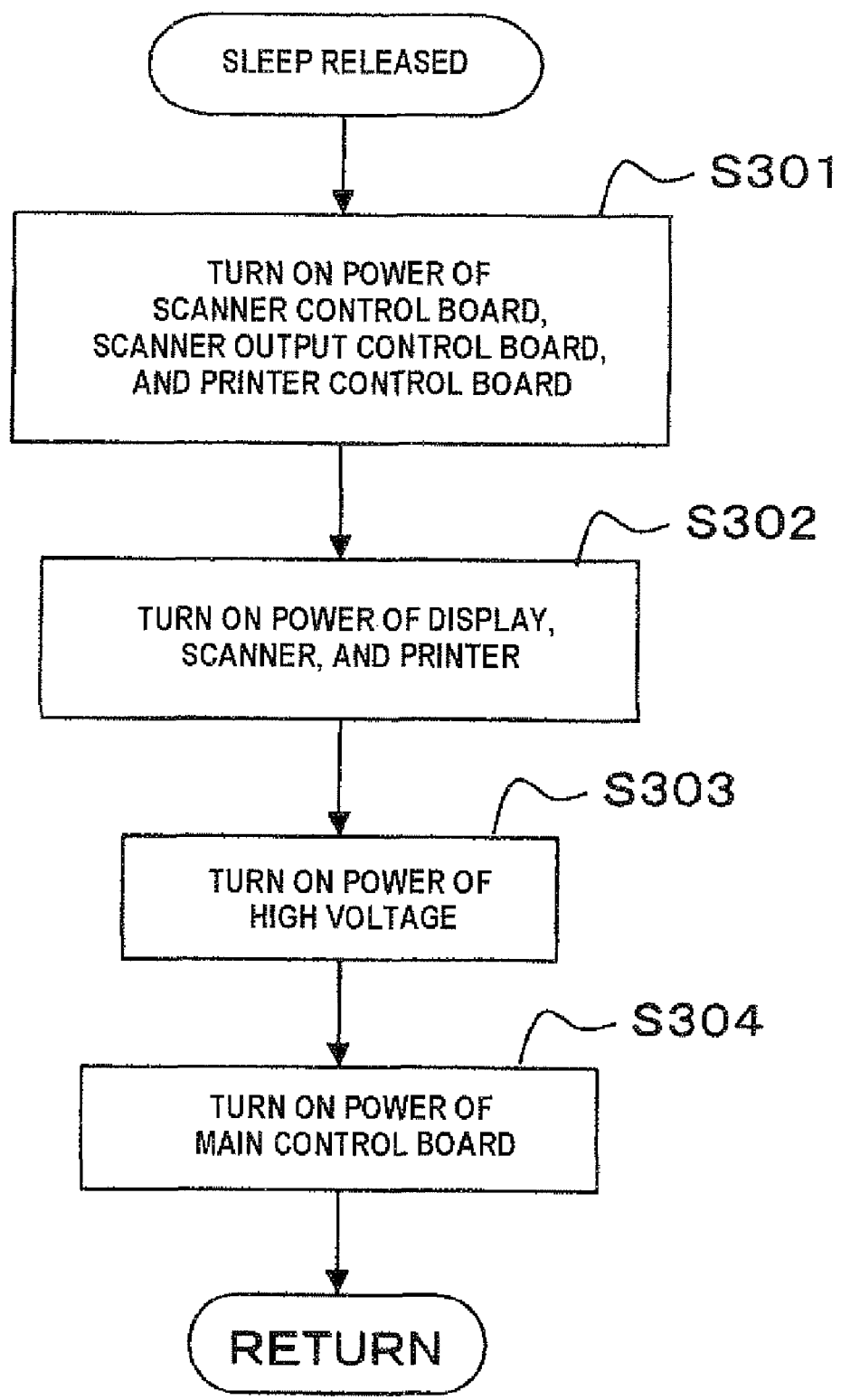
FIG. 5 shows a schematic operation flow of power supply control of the multiple function apparatus.

Next, a schematic operation flow of power supply control of the multiple function apparatus shown in FIG. 1 is shown with FIGS. 3, 4, and 5. When main power of the multiple function apparatus is turned on, power is supplied to all units of the multiple function apparatus shown in FIG. 1. At step S101, whether or not off operation of the main power is performed is determined. If off operation is performed, the process is terminated.

If off operation is not performed, the multiple function apparatus operates in the standby mode (step 102). In the standby mode, the corresponding operation is performed in response to operation of the operation unit and an external input signal. At step S103, in the standby mode, whether or not a predetermined time (for example, 20 minutes) during which no operation is performed has elapsed is detected. When the time does not elapse, the process returns to step 5101; when the time has elapsed, the sleep mode is set (step 8104).

When the sleep mode is set, the sleep mode operation is performed at step 8105. Specifically, as shown in FIG. 4, power of the scanner control board 400, the scanner output control board 500, and the printer control board 600 is turned off (step S201), next, power of the display 310, the scanner 410 (containing the scanner read unit 510), and the printer 610 is turned off (step S202), and further high-voltage power for the printer is turned off (step S203). Last, power of the main control board 200 is turned off (step S204). In this state, power is turned off except for the PLC board 100 or the FAX control board 700 and power can be saved. In the example, the power of the FAX control board 700 remains on, but may be turned off.

In the sleep mode, when the power supply control circuit module 40 of the PLC board 100 detects state change of the multiple function apparatus and detects state change, the sleep mode is released. Specifically, at step S106, operation of the sleep switch is detected, the sleep mode is released (step S111) and the process goes to S102. The sleep mode is released by turning on power of the units of the multiple function apparatus in the order as shown in FIG. 5. That is, power of the scanner control board 400, the scanner output control board 500, and the printer control board 600 is turned on at step S301, power of the display 310, the scanner 410 (containing the scanner read unit 510), and the printer 610 is turned on at step S302, and high-voltage power for the printer is turned on at step S303. Last, power of the main control board 200 is turned on (step S304).

Referring again to FIG. 3, when output of the paper sensor is detected at step 5107, the sleep mode is released (step S112) and copy operation is performed (step S113) and the process goes to S102. When FAX reception is detected at step S108, the sleep mode is released (step S114) and FAX operation is performed (step S115) and the process goes to S102. When reception of a USB signal is detected at step S109, a USB-NAK signal is transmitted to the main control board 200 (step S116), the sleep mode is released (step S117), transmission-reception operation of the USB signal is performed (step S118), and the process goes to step S102. When reception of a LAN signal is detected at step S110, the sleep mode is released (step S119), transmission-reception operation of the LAN signal is performed (step S120), and the process goes to step S102.

The PLC board 100 is provided independently of the blocks (the main control board 200, the panel board 300, the operation panel with the display 310, the scanner control board 400, the scanner drive unit 410, the scanner output processing board 500, the scanner read unit 510, the printer control board 600, the printer 610, and the FAX control board 700) involved in the operation of the multiple function apparatus. Thus, after transition to the sleep mode, power is supplied only to a few units containing the PLC board 100 until the power supply control circuit module 40 of the PLC board 100 detects state change of the multiple function apparatus. Therefore, power consumption can be decreased. Although each unit to which power is supplied in the sleep mode can be selected as required, if the PLC board 100 only is selected, power is most saved.

In the example described above, the mode in which the power supply control unit 41 is provided in the PLC board 100 is shown, but providing the power supply control unit 41 independently of the PLC board 100 is also preferable. In this case, it is considered that power is supplied to the power supply control unit 41 from the PLC power supply unit 20.

In the description given above, the multiple function apparatus has the function of conducting power line communications and performs Ethernet cable communications connected through the LAN modular jack 22, communications using a telephone line, and USB communications, but may further conduct communications through a different transmission medium, for example, wireless LAN communications.

As an example of electronic device, the case applied to the multiple function image forming apparatus (multiple function apparatus) including a plurality of image processing functions has been described, but an electronic device for executing a single image processing function may be adopted. Further, an electronic device having any other function than the image processing function may be adopted.

It is to be understood that the invention is not limited to the items shown in the embodiments described above and the invention is also intended for those skilled in the art to make modifications and application based on the Description of the invention and well-known arts and the modifications and the application are contained in the scope to seek protection.

The present invention is useful as an electronic device, an image processing apparatus, and the like capable of decreasing power consumption.

What is claimed is:

1. An electronic device comprising:
    a power line communication unit that receives a power line communication signal superposed on power transmitted through a power line;
    an operation unit that processes the power line communication signal and executes a predetermined operation;
    a first power supply unit that supplies power to the operation unit;
    a second power supply unit that is provided independently of the first power supply unit and supplies power to the power line communication unit; and
    a power supply control unit that controls power supply to the operation unit performed by the first power supply unit on the basis of the power line communication signal.

2. The electronic device as claimed in claim 1, further comprising
    a reception unit that receives a communication signal through a transmission medium different from the power line, wherein
    the operation unit further processes the communication signal and executes a predetermined operation, and
    the power supply control unit further controls power supply to the operation unit performed by the first power supply unit on the basis of the communication signal.

3. The electronic device as claimed in claim 2, wherein
    the communication signal contains information concerning the operation unit, and
    the power supply control unit controls power supply to the operation unit performed by the first power supply unit on the basis of the information.

4. The electronic device as claimed in claim 3, wherein the information concerning the operation unit is an IP address.

5. The electronic device as claimed in claim 2, further comprising
    a relay unit that relays the communication signal to the power supply control unit.

6. The electronic device as claimed in claim 2, wherein the transmission medium is a public communication line.

7. The electronic device as claimed in claim 2, wherein the transmission medium is a LAN cable.

8. The electronic device as claimed in claim 2, wherein the transmission medium is a USB cable.

9. The electronic device as claimed in claim 8, wherein the operation unit has at least one of a facsimile function, a printer function, a copy function, and a scanner function.

10. The electronic device as claimed in claim 2, wherein the operation unit performs image processing on the basis of data contained in at least either the power line communication signal or the communication signal.

11. The electronic device as claimed in claim 1, further comprising
a signal input section for inputting a control signal for controlling the operation of the operation unit, wherein
the power supply control unit controls power supply to the operation unit performed by the first power supply unit on the basis of the control signal.

12. The electronic device as claimed in claim 11, wherein the signal input section is an operation panel of the electronic device.

13. The electronic device as claimed in claim 11, wherein the signal input section is a sensor provided in the electronic device.

14. The electronic device as claimed in claim 1, wherein the operation unit is a main control unit for controlling the whole of the electronic device.

15. The electronic device as claimed in claim 1, wherein the power line communication unit and the power supply control unit are formed on the same circuit board.

* * * * *